Nov. 3, 1942.　　　　G. W. UPP　　　　2,301,099
CONTROL MECHANISM
Filed July 11, 1940　　　3 Sheets-Sheet 1
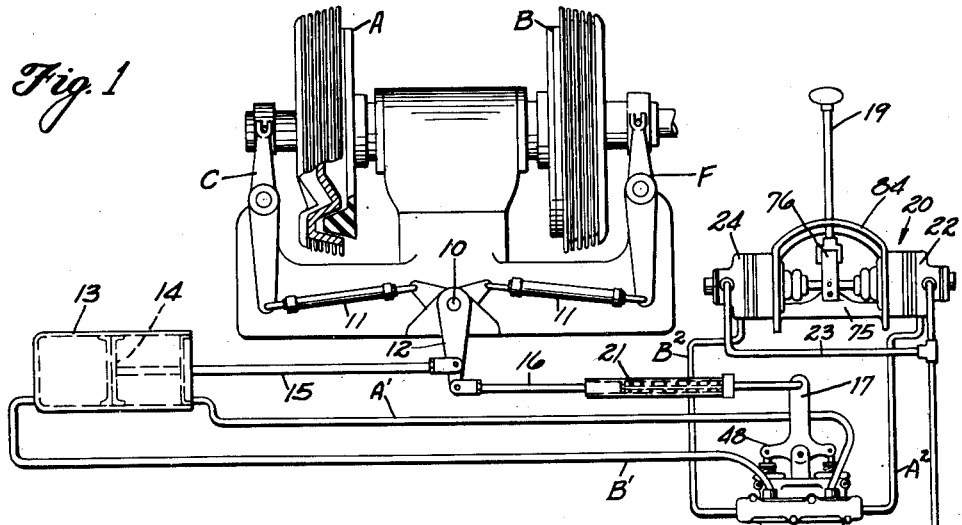
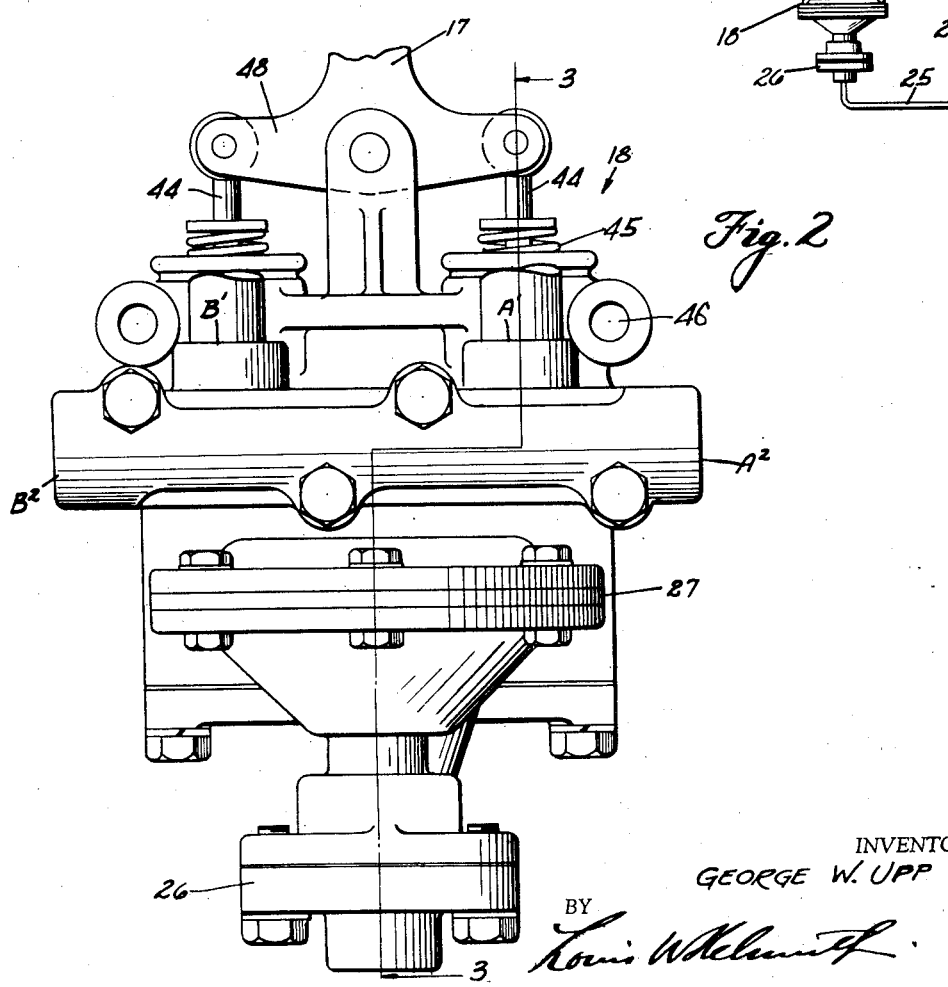
INVENTOR.
GEORGE W. UPP
BY Nov. 3, 1942.   G. W. UPP   2,301,099
CONTROL MECHANISM
Filed July 11, 1940   3 Sheets-Sheet 2
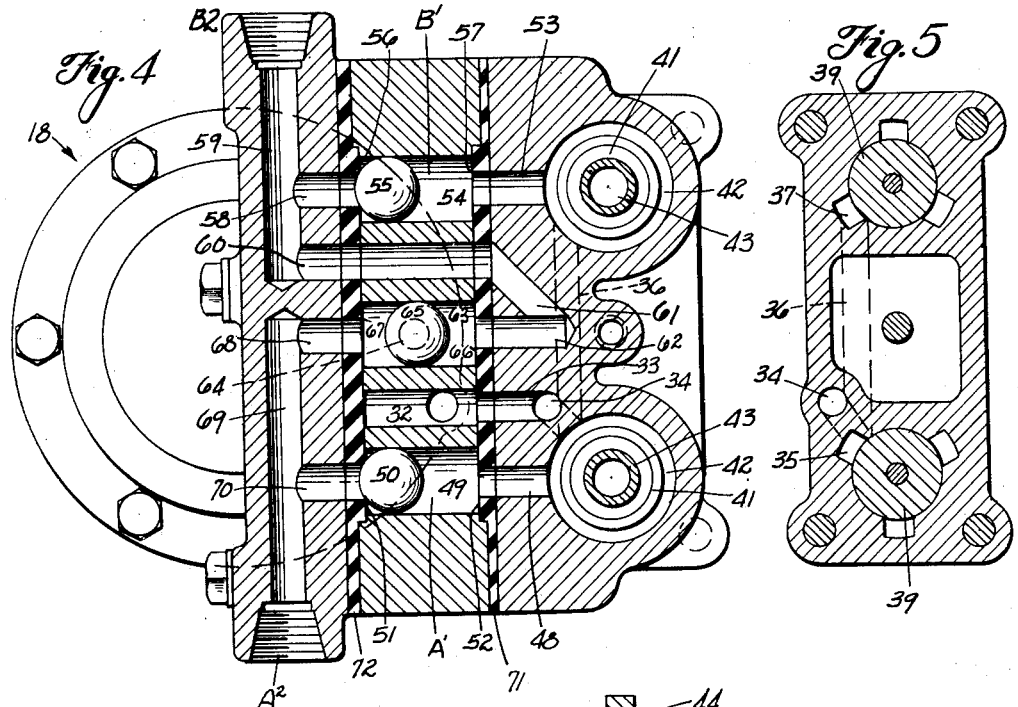
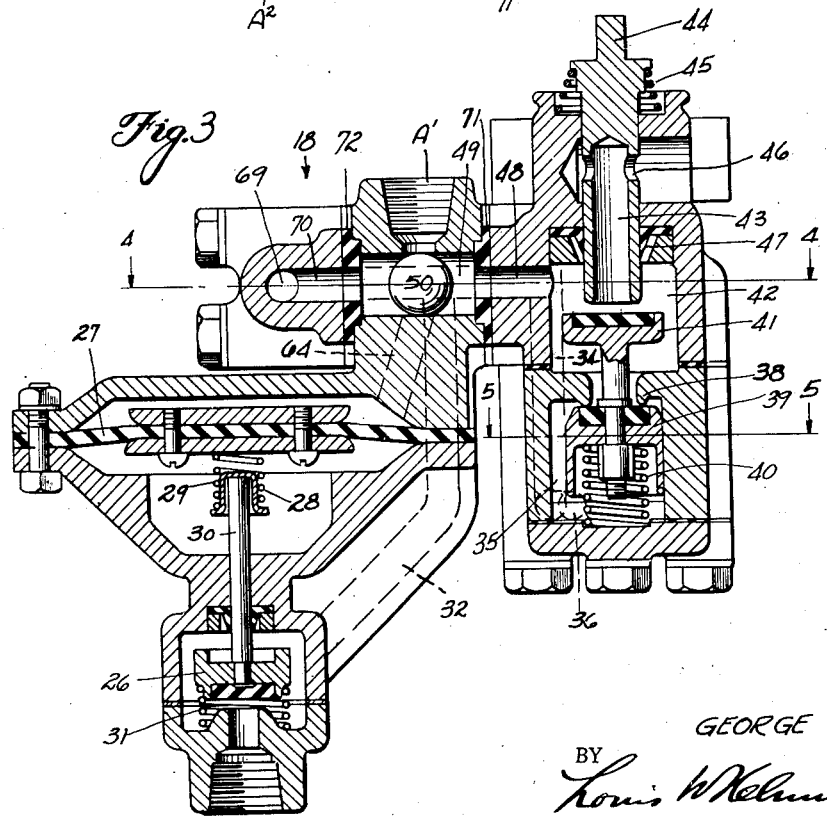
INVENTOR.
GEORGE W. UPP
BY
Louis W. Kelmith Nov. 3, 1942.                G. W. UPP                 2,301,099
                        CONTROL MECHANISM
                      Filed July 11, 1940           3 Sheets-Sheet 3

INVENTOR.
GEORGE W. UPP
BY
Louis W. Helmuth

Patented Nov. 3, 1942

2,301,099

UNITED STATES PATENT OFFICE 2,301,099

CONTROL MECHANISM

George W. Upp, Lakewood, Ohio, assignor to The Midland Steel Products Company, Cleveland, Ohio, a corporation of Ohio Application July 11, 1940, Serial No. 344,962

9 Claims. (Cl. 121—38)

This invention relates to new and useful improvements in control mechanisms in which a device is operated to opposite sides of a neutral position, and an important object of this invention is to provide means for automatically returning such device to neutral position corresponding to a neutral position of an operated part.

Another object of the invention is to provide a power driven mechanism operable to opposite sides of a neutral position, by means of a control valve operating through a centralizing valve to positively restore the mechanism to neutral position whenever the control valve is arranged in similar position.

A further object of the invention is to provide a control valve for this apparatus having an operating part and a pair of valves which are normally urged and automatically returned to neutral positions independently of any driven mechanism, thereby leaving the centralizing or neutralizing mechanism to function in an entirely automatic fashion.

Another object of the invention is to provide a control valve consisting of opposed valves and an intermediate operating part upon which is impressed a reaction pressure in opposition to the direction it is moved to provide compensating finger tip control and apprise the operator of the amount of fluid pressure being exercised through the valve.

A still further object of the invention is to provide a pressure system including a power operated piston and a dual control valve connected thereto through a centralizing valve, which latter is connected with a source of pressure which is cut off to the centralizing valve whenever the control valve is out of neutral position, at which time the source of pressure is piped through the control valve and centralizing valve to the power actuated piston which is returned to neutral position through the action of the centralizing valve whenever the control valve is placed in neutral position.

Other objects and advantages of the invention will become apparent during the course of the following description.

In the accompanying drawings forming a part of the application and wherein like numerals are employed to designate like parts throughout the several views:

Fig. 1 is a diagrammatic view of the control mechanism designed especially for the simultaneous control of a pair of clutches, brakes or the like, Fig. 2 is a side elevation of the centralizing valve, Fig. 3 is a vertical section of the same taken on the line 3—3 of Fig. 2, Fig. 4 is a horizontal section of the valve taken on the lines 4—4 of Fig. 3.

Fig. 5 is a horizontal section taken on the line 5—5 of Fig. 3.

Figure 6:
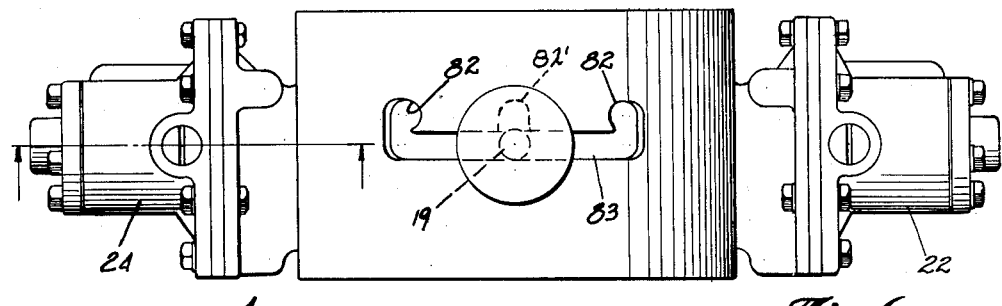
Fig. 6 is a top plan of the control valve.

While the present invention has a variety of uses, it is here shown for the control of the boom deck of power shovels which include a pair of cone clutches A and B which are both normally disengaged. When the clutch A is engaged, the boom deck will be swung to the left and when the clutch B is engaged and clutch A is disengaged, the deck will be swung to the right as is well understood in the art. A pivotally mounted clutch operating fork C is provided for operating clutch A while a similar clutch operating fork F is provided for the operation of the clutch B.

For alternately engaging the clutches, a shaft 10 is journaled in bearings at a point equi-distant between the two clutches and is provided with a pair of crank arms by which the shaft is connected with the lower ends of the clutch operating forks C and F. The clutch operating shaft 10 is provided with a depending clutch operating crank arm 12 which is arranged in a vertical depending position when both clutches are disengaged. This is the neutral position of the arm 12 and it may be swung to either side of its neutral position for selectively operating the clutches A and B.

A power cylinder 13 is arranged horizontally and is provided with a double acting piston 14 and a piston rod 15 which is pivotally connected to an intermediate point of the crank arm for power operating the same.

A valve actuating rod 16 is pivotally connected to the free end of the operating crank 12 and the upper end of an inverted T-shaped valve lever 17 of a centering valve 18, which serves to automatically effect the return of the operating crank 12 to a central or neutral position through the piston 14 when the operating handle 19 of a control valve 20 is placed in neutral position. Since the throw of lever 17 is less than lever 12, a yielding two-way compensating connection 21 is interposed in the valve rod 16. This connection is composed of a tube secured to one section of the valve rod 16 and a head on the other section of the valve rod which causes the compression of a coil spring arranged between the two whenever there is any excess travel of lever 12 in either direction. The coil spring in this connection 21 is preloaded sufficiently to operate the valve handle without losing any travel and may also serve as means for returning the lever 12 to neutral position. Similar yielding connections may constitute the links 11 for operating the cone clutch forks C and F.

For supplying and exhausting fluid under pressure to opposite ends of the power cylinder 13, pipes A' and B' lead to opposite closed ends of the power cylinder and connect with check valve chambers of the centering valve marked with corresponding letters (see Fig. 4).

The control valve 20 primarily controls pressure to the actuator cylinder 13 for engaging the clutches A and B, while the centering valve 18 is operated by the position of the clutches through the operating lever 12 as well as the position of the control valve, since the latter cuts off pressure to the centering valve whenever the control valve is not in neutral position. Fluid under pressure comes from a source of supply through a pipe 21' and is led to one valve 22 of the dual control valve 20, while a branch 23 from the pressure pipe leads to the other valve 24 of the dual control valve 20. A pressure conveying pipe A2 leads from the valve 22 to a correspondingly lettered port of the centering valve and a similar pressure pipe B2 leads from the control valve 24 to a correspondingly lettered port at the opposite side of the centering valve 18 as clearly shown in Fig. 1. A branch pipe 25 from the pressure pipe 21 leads to a diaphragm operated valve 26 in the centering valve 18 which is open whenever the operating handle 19 of the control valve is in neutral position so that the centering valve is then supplied with fluid pressure which may be conveyed to either end of the power operated cylinder 13 for positively disengaging both clutches A and B in the event operating lever 12 has failed to return to neutral position when the operating handle 19 of the control valve has been placed in such position.

Referring to Figs. 3 to 5, it will be seen that the centering valve 18 is provided with a fluid pressure operated diaphragm 27 which is normally held in one extreme position by a coil spring 28 supported by a cap 29 positioned upon the upper end of a valve stem 30 connected with the pressure inlet valve 26 normally held off of its seat by a coil spring 31. Thus, fluid pressure passes from the source of supply around the normally open valve 26 through a passage 32 vertically into a horizontal passage 33 and then downwardly through a vertical passage 34 to one of two inlet valve chambers 35. A horizontal passage 36 communicates the inlet valve chamber 35 with a corresponding inlet valve chamber 37 so that whenever the pressure control valve 26 is open, fluid under pressure will be conveyed to both of the inlet valve chambers 35 and 37. This condition exists whenever the control valve handle 19 is in neutral position, so that fluid under pressure can be conveyed to either end of the power cylinder 13 depending upon the position of the valve lever 17 and the operating crank 12.

A combined inlet and exhaust valve is provided for each of the chambers 35 and 37 and since they are both of identical construction, a description of one will suffice for both. Each chamber 35 and 37 of the centering valve is provided with a downwardly extending valve seat 38 upon which is normally seated an inlet valve 39 by reason of a coil spring 40 normally biasing this valve to closed position. This normally traps fluid pressure in the chambers 35 and 37. Each poppet inlet valve 39 is provided with an axial extension terminating in an integral exhaust valve 41 disposed in a chamber 42, into which projects the lower tubular end 43 of a valve tappet 44. The upper end of the tappet projects upwardly through the top of the centering valve to be normally biased upwardly by a spring 45 which normally disengages the lower end of the tube 43 from the exhaust valve 41 and permits exhausting of chamber 42 through the tube 43 and then through lateral ports 46 to the atmosphere. Each sleeve 43 is slidably mounted through a suitable packing gland 47 to seal the same against leakage. The upper ends of the valve tappet 44 are engaged by the arms 48 of the inverted T-shaped lever 17 as best appreciated from Figs. 1 and 2. The arms 48 are provided with rollers for engaging the tappets 44.

The chamber 42 of one of the valves communicates through a lateral passage 48 with a check valve chamber 49 having a ball check valve 50 movable freely and axially thereof to engage with axial seats 51 and 52 at either end thereof. Thus, when fluid pressure is admitted to chamber 42 it passes into the check valve chamber 49 and forces ball check valve 50 upon its seat 51 thereby permitting fluid to pass out of the top thereof through the pipe A' to the right hand end of power cylinder 13 thereby moving the clutch operating crank 12 to the left of Fig. 1 from its dotted line position in the event the control valve handle 19 has been placed in neutral position and the right hand clutch B has become adhered in the complementary female part.

The other fluid pressure chamber 42 of the centering valve communicates through a lateral passage 53 with a similar double check valve chamber 54 having a ball check valve 55 movable axially therein from end to end to seat either upon valve seat 56 or 57 disposed at the ends thereof. This ball check 55 operates in the same manner as ball check 50, but controls fluid pressure so that when it exists in chamber 42 the ball check 55 is seated upon its seat 56 thereby allowing fluid pressure to pass through pipe B' to the left hand of power cylinder 13. The ball checks 50 and 55 may be normally urged toward their respective seats 52 and 57 by light coiled springs, not shown.

The ball check 55 is moved to seat upon its seat 57 whenever fluid pressure is admitted into passage 59 from the control valve 24 via pipe B2, since such pressure passes through lateral ports 58 extending through the valve seat 56. At the same time, this fluid pressure from the control valve 24 is exercised through a second lateral port 60, and inclined passage 61 and a back tracking passage 62 which leads into a double check valve chamber 63. This chamber has a central diaphragm port 64 leading to the upper face of diaphragm 27 and is opened to whichever end of the ball check chamber 63 at which there is a predominating pressure. A ball check valve 65 is adapted to be moved by this pressure, axially within the chamber 63 to either seat upon its seat 66 at one end of the chamber or upon the seat 67 arranged at the opposite end of the chamber. A lateral port 68 extends through the valve seat 67 into a passage 69 which communicates with the pipe A2 leading to the control valve 22. A lateral port 70 communicates with the passage 69 and extends through the valve seat 51 in check valve chamber 49. Since both of the control valves 22 and 24 are connected to opposite ends of the double check valve chamber 63, it will be obvious that irrespective which control valve 22 or 24 is operated, fluid pressure will be set up in passage 64 to be exercised upon the diaphragm 27, thereby depressing the same and closing the inlet valve 26 which cuts off fluid pressure supply to the centering valve 18 whenever either control valve is opened by manipulation of the operating handle 19 to one side or the other. However, when this handle is in neutral position, no fluid pressure is exercised upon the diaphragm 27, so that it returns to the position shown in Fig. 3 to open the inlet valve 26 and allow fluid pressure to be admitted to whichever chamber 42 of the centering valve is opened to pressure by the position of valve operating lever 17 and position of clutches A and B. Consequently, the inlet valve 39 of the centering valve which is opened by the rocking of the valve lever 17 and the position of the clutches, determines the end of the operating cylinder 13 which is opened to pressure to return the clutch operating lever 12 to neutral position whenever the control valve handle 19 is arranged in a neutral position. Thus, the two clutches are brought to neutral or disengaged position by the positive action of air pressure whenever the control handle 19 is arranged in neutral position and the clutches are not so positioned.

The construction of the centering valve is unique, especially with regard to the three double check valves 50, 55 and 65 and their chambers, since the latter are all formed by straight boring through a central displaceable intermediate element of the centering valve, and all of the valve seats of these three double check valves are provided by a pair of elastic gaskets 71 and 72 which are clamped in position between the three sections of the centering valve casing in proper positions to form the six seats of the three double check valves.

Figure 7:
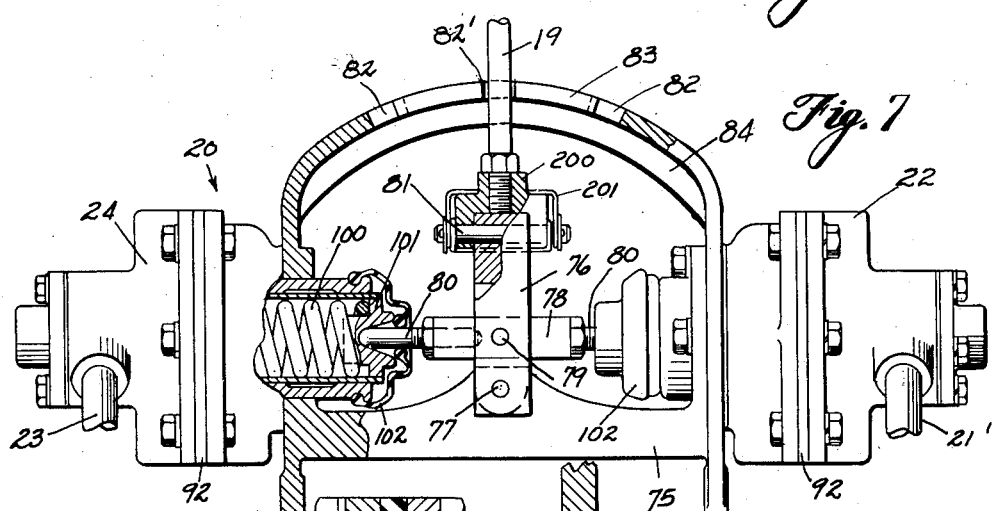
Fig. 7 is a side elevation of the same with the parts thereof broken away.
Figure 8:
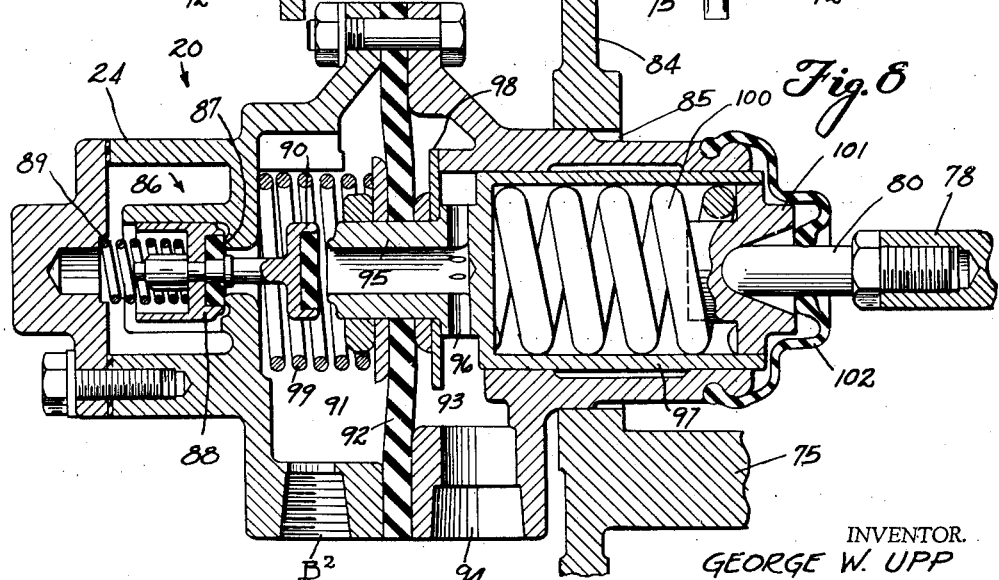
Fig. 8 is an enlarged vertical longitudinal section through one of the valves of the control valve mechanism.

The mechanism of the dual control valve 20 is shown in detail in Figs. 6 to 8 inclusive, wherein the main supporting structure is designated by the numeral 75 which is secured to a stationary support. An actuator fork 76 straddles and is pivoted to the base 75 by a pivot pin 77. Extending transversely through this fork is a link 78 which is pivoted thereto as at 79 and has a valve actuating rod 80 adjustably connected to each end thereof in axial alignment. To the upper end of the fork 76 is pivotally connected the lower forked end 200 of the operating lever 19 by means of a pivot 81 arranged at right angles to the pivot 77 so that after the fork 76 has been swung upon the latter, to operate either valve 22 or valve 24, the operating handle 19 may be swung laterally against the tension of a spring 201, and be held latched in either end notch 82 of a slot 83. When moved laterally into a central notch 82', the lever 19 may engage the usual swing brake valve, not shown, which operates a mechanism to lock the boom deck against accidental rotation. The slot 83 is provided in the arched or looped portion 84 of the support 75 as clearly shown in Fig. 7. The spring 201 has opposite ends attached to the pivot 81 with its intermediate part pressing against the handle 19 to normally hold it in upright position free of the edges of slot 83. The parts 76 and 200 are so shaped that handle 19 can only tilt to one side of the slot 83 and into the notches 82 or 82'.

Since both control valves 22 and 24 of the dual control valve are identical in construction, a description of one will suffice for both. Each control valve comprises a casing with its inner end projecting through and secured within an opening 85 in one side of the yoke so that these valves are arranged at opposite sides of the yoke in longitudinal alignment with one another. Each control valve casing is provided with an inlet chamber 86 which the pressure pipes 21 and 23 supply with fluid under pressure. Each chamber is provided with a valve seat 87 upon which is normally seated an inlet valve 88, normally biased to its seat by means of the coil spring 89. This inlet valve is provided with an integral stem terminating in an exhaust valve 90 arranged within a pressure chamber 91 which is connected by pipe B2 or A2, to the centering valve as hereinbefore described. A pressure responsive diaphragm 92 forms a partition or wall of the chamber 91 and also one wall of an exhaust chamber 93 on the opposite side of the diaphragm. This exhaust chamber 93 vents to the atmosphere through a port 94.

A valve plunger has a reduced hollow end 95 extending through and secured to the center of the diaphragm 92 to cooperate in seating upon the exhaust valve 90 when the plunger is moved axially to unseat the inlet valve 88 and permit pressure to pass from the chamber 86 into pressure chamber 91. This interaction of the parts closes the opening of the hollow portion 95 of the plunger, which hollow portion is in communication with lateral passages 96 opening into the exhaust chamber 93. When the valve plunger is in normal position with the operating handle 19 in neutral position, the hollow member 95 is unseated from the exhaust valve so that pressure in chamber 91 may be relieved through the hollow member 95 and may exhaust through the port 94 to the atmosphere.

The outer end of the plunger 95 has an enlarged sleeve 97 slidably mounted within the tubular portion of the valve casing which projects through the opening in the yoke. The plunger at the junction of the large and smaller portions thereof, is provided with a stop collar 98 which abuts a portion of the casing to limit the movement of the diaphragm and actuator in the direction biased by spring 99 in chamber 91. This spring normally unseats the exhaust valve 90 from the end of the hollow member 95. Within the enlarged end of the plunger is disposed a spring 100 upon one end of which bears a sliding cap 101 having an axial depression to receive the free end of the adjustable valve stem 80. A rubber boot 102 may be secured to the end of the valve casing and snugly engage the valve rod to exclude extraneous matter from the sliding parts of the valve. Thus, when the valve stem 80 is moved to the left of Fig. 8, it moves the cap against the spring 100 to stress the same and move the hollow member 95 axially to the left of Fig. 8 to engage the exhaust valve 90, thereby closing it prior to forcing the inlet valve 88 off of its seat to admit a higher pressure into the chamber 91. Whatever pressure exists in this chamber impresses itself upon the diaphragm to slightly react against the opening of the valve to apprise the operator of the prevailing pressure. From the foregoing description, it will be apparent that when the operating lever 19 is moved to the left of Fig. 8, the valve 24 will be opened to convey fluid pressure through the centering valve and pipe B' to the left hand end of the actuating cylinder 13, and when the operating handle is moved to the right of the figures, the valve 22 will be opened to permit fluid pressure to pass from the control valve through the centering valve and pipe A' into the right hand end of the actuating cylinder 13. Whenever the operating handle 19 is moved from its neutral position, the check valve 65 in the centering valve will be unseated to permit pressure to be exercised upon the diaphragm 27 to close the inlet valve 26, thereby cutting off pressure to those portions of the centering valve which lead to the actuator cylinder 13. When however, the operating lever 19 is in neutral position and either one clutch or the other remains in engaged position, fluid pressure is admitted from the source to the centering valve so that it will pass to whichever end of the actuator cylinder requires pressure to bring the clutch operating lever 12 back to neutral position, at which time both exhaust valves 41 of the centralizing valve will be open to vent both sides of the actuator cylinder to atmosphere, thereby centralizing the clutch operating lever 12. It will of course be understood that the control valve can be piped directly to the cylinder 13 in cases where the services of the centering valves are not required.

From the foregoing, it is believed that the various aspects of the device will be apparent and it is to be understood that various changes in the relation of parts may be resorted to without departing from the spirit of the invention or the scope of the appended claims.

I claim:

1. The combination with an operator having a neutral position and operative positions upon either side thereof; of an actuator cylinder for moving the operator to and from either operative position, a control valve, pressure lines connecting the control valve with opposite ends of said cylinder, automatic valve means having a normally open pressure responsive supply valve and a pair of inlet valves connected with said operator to assume positions governed by the latter, said inlet valves controlling flow from the supply through the automatic valve to supply pressure to the cylinder when said pressure responsive valve is open and to allow pressure fluid from said source to enter the automatic valve only when said control valve is in a neutral position.

2. The combination with an operator having a neutral position and operative position upon either side thereof; of an actuator cylinder for moving the operator to and from either operative position, a source of pressure fluid, a centralizing valve connected to said operator and including a pair of valves operated thereby, a pressure responsive valve between said source and centralizing valve, a dual control valve, conduits from the source to the dual control valve, conduits from the dual control valve to opposite ends of the cylinder, and check valve means associated with the conduits leading to said cylinder to direct pressure fluid from the source to the end of the cylinder to which it is directed by said control valve and to direct the pressure to the pressure fluid responsive valve to cut off pressure fluid from the source to the centralizing valve when the control valve is not in neutral position, and to admit pressure fluid to pass from the source through the centralizing valve to the cylinder when the control valve is in neutral position and the operator is not in neutral position.

3. The combination with an operating lever having a neutral position and operative positions upon either side thereof; of an actuator cylinder for moving said lever to and from either operative position, a control valve and an automatic valve both connected to a source of pressure fluid, said automatic valve having a pair of ports connected to opposite ends of said actuator cylinder and a pair of ports connected to said control valve and having a pressure fluid operated supply valve normally open to supply pressure from said source to the automatic valve whenever said control valve is in neutral position, said automatic valve having a pair of inlet valves alternately operable by the un-neutral position of said operating lever, a double check valve controlling a passage to said pressure operated supply valve to admit pressure fluid from either control valve port to close said inlet valves to pressure fluid from said source, and a pair of chambers connecting the aforesaid ports and said inlet valve and pressure fluid operated check valves in said chambers.

4. The combination with an operating lever having a neutral position and operative positions upon either side thereof; of an actuator cylinder having a piston connected with said operating lever to move the same to and from either operative position, a control valve having neutral and operative positions, an automatic valve having a pair of inlet valves connected with opposite ends of said actuator cylinder and a lever for said inlet valves connected with said operating lever, said automatic valve having a pressure responsive valve for controlling pressure to said inlet valves and connected with said control valve whereby pressure fluid is supplied to said actuator cylinder from the automatic valve when the operating lever is in either operative position and the control valve is in a neutral position.

5. The combination with an operating lever having a neutral position and operative positions upon either side thereof; of an actuator cylinder having a piston therein connected with said operating lever, a source of pressure fluid, a control valve connected therewith and having neutral and applied positions, an automatic valve including a pressure responsive valve connected to said source of pressure fluid and connected with said control valve to be operated by pressure fluid delivered therefrom, said automatic valve having a pair of control valves supplied with pressure fluid from said source of pressure whenever the control valve is in neutral position, means for connecting said control valve with opposite ends of the actuator cylinder, and said automatic valve having a lever controlling said pair of valves connected with said operating lever to control the supply of pressure fluid to the actuating cylinder whenever said control valve is in neutral position.

6. The combination with an operating lever having a neutral position and operating positions upon either side thereof; a source of pressure fluid, an actuator cylinder with a piston therein connected with said operating lever and adapted to be moved in opposite directions, a control valve connected with the source of pressure fluid and having neutral and applied positions to direct pressure fluid to either end of said cylinder, an automatic valve including the normally open pressure responsive valve connected with said source of pressure fluid, with said actuator and with said control valve whereby said pressure responsive valve is operated by pressure fluid delivered therefrom when said control valve is in operating position, and said automatic valve having a pair of control valves connected with said operating lever and adapted to be operated whenever said lever is in either of the operating positions to permit pressure from said source to be directed by said pair of valves to either end of said actuator cylinder.

7. The combination with an operating lever having a neutral position and operating positions upon either side of said neutral position, a source of pressure fluid, an actuator cylinder having a piston therein connected with said operating lever, an automatic valve having a pair of valve chambers and valves therein operated by a lever connected to said operating lever, and a check valve chambers with check valves connected with opposite ends of said actuator cylinder and with said pair of valve chambers, and a control valve connected with said check valve chambers and adapted to move said check valves by a pressure fluid from the control valve to close off the valve chambers of the automatic valve and direct pressure fluid to said cylinder.

8. A valve comprising a casing having a pair of pressure ducts, a pair of pressure inlet valve chambers with mechanically operated valves, a check valve chamber communicating at one end with each first mentioned valve chamber and having an intermediate outlet port and a check valve therein, the other end of each check valve chamber communicating with one of said pressure ducts whereby the respective check valve is moved to close off its associated mechanical valve chamber and to open said intermediate outlet port when pressure in said duct predominates pressure from the mechanical valve chamber, and whereby said check valve is moved in the opposite direction to close off said duct and open said intermediate port when pressure from said mechanical valve predominates pressure from said duct.

9. A valve comprising a casing having a pair of pressure ducts, a pair of pressure inlet valve chambers with mechanically operated valves, a check valve chamber communicating at one end with each first mentioned valve chamber and having an intermediate outlet port and a check valve therein, the other end of each check valve chamber communicating with one of said pressure ducts, a pressure operated inlet valve for supplying pressure to both mechanical valves, a third check valve chamber communicating at opposite ends with said ducts and having an intermediate port communicating with said pressure operated inlet valve to close the same whenever pressure in said ducts moves said named pair of check valves to close off their communication with said pair of mechanical valves.

GEORGE W. UPP.